(12) United States Patent
Kennemur et al.

(10) Patent No.: US 11,459,420 B2
(45) Date of Patent: Oct. 4, 2022

(54) BLOCK COPOLYMERS, MEMBRANES AND METHODS

(71) Applicant: The Florida State University Research Foundation, Inc., Tallahassee, FL (US)

(72) Inventors: Justin G. Kennemur, Tallahassee, FL (US); Brandon A. Fultz, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 17/241,163

(22) Filed: Apr. 27, 2021

(65) Prior Publication Data

US 2021/0332177 A1    Oct. 28, 2021

Related U.S. Application Data

(60) Provisional application No. 63/016,616, filed on Apr. 28, 2020.

(51) Int. Cl.
  *C08F 299/02* (2006.01)
  *C08F 220/38* (2006.01)

(52) U.S. Cl.
  CPC ........ *C08F 299/024* (2013.01); *C08F 220/38* (2013.01); *C08F 2438/03* (2013.01); *C08L 2203/16* (2013.01)

(58) Field of Classification Search
  CPC ............... C08F 220/38; C08F 2438/03; C08F 293/005; C08F 299/024; C08F 226/06; C08F 220/14; C08L 2203/16
  See application file for complete search history.

(56) References Cited

PUBLICATIONS

Creutz Macromolecules 1997, 30, 5596-5601 (Year: 1997).*
Cai et al. Journal of Membrane Science 555, 2018, 69-77 (Year: 2018).*
Cai et al. Journal of Membrane Science 555, 2018, 69-77 supporting information (Year: 2018).*
Liu et al., "A Novel Method for Fabricating Composite Mosaic Membrane with Unique NF Selectively," China Particuology, 2006, 4(2): 98-102.
Ishizu et al., "Charge mosaic membrane with a microstructure of poly(styrene-b-4-vinylpyridine)," Journal of Polymer Science: Polymer Chemistry Edition, 1985, 23(4):1099-1108.

* cited by examiner

*Primary Examiner* — Mark S Kaucher
(74) *Attorney, Agent, or Firm* — Eversheds Sutherland (US) LLP

(57) ABSTRACT

Block copolymers, thin films including block copolymers, and methods for forming block copolymers and thin films. The block copolymers, due to self-assembly or otherwise, may include one or more regions. The one or more regions may permit a thin film including a block copolymer to be used as a nanostructured membrane.

20 Claims, 6 Drawing Sheets

BLOCK COPOLYMERS, MEMBRANES AND METHODS

CROSS-REFERENCE TO RELATED APPLICATIONS

This application claims priority to U.S. Provisional Patent Application No. 63/016,616, filed Apr. 28, 2020, which is incorporated herein by reference.

BACKGROUND

Charged mosaics are systems with coexisting yet separate domains of positive and negative charge. As membranes, these systems may have unique transport properties compared to typical ion exchange membranes that include one type of single ion conductor (positive or negative). For example, membranes with channels of polycations may allow preferential permeation of anions over cations in a solution, leading to a loss of electroneutrality and the problem of salt rejection.

A membrane with coexisting "zones" rich in either polyanions or polycations may allow the simultaneous transport of both cations and anions, respectively, without violating macroscopic electroneutrality. Therefore, an ion current could be established between the individual exchange elements that may accelerate salt transport through the membrane and deter permeation of neutral species of similar size.

One of the limitations preventing the development and understanding of charged mosaic technologies, particularly at the nanofiltration scale, includes the need to identify new materials and methods to create them. This is in addition to other properties that greatly affect ion transport, such as the morphology and size of the mosaic pattern.

Autonomous block copolymer (BCP) self-assembly can be used to create large area nanoscale templates with tunable size and morphology, but efforts to synthesize charged mosaics from self-assembled BCPs stalled decades ago (see, e.g., Fujimoto, T. et al. *Journal of membrane science* 1984, 20, 313-324; Nunes, S. P. et al., *Ind. Eng. Chem. Res.* 2013, 52, 993-1003; and Ishizu, K. et al., *Journal of Polymer Science: Polymer Chemistry Edition* 1985, 23, 1099-1108.

There remains a need for new block copolymers, thin films of block copolymers, and methods for making block copolymers that may self-assemble into desirable physical configurations, be easily ionized, or a combination thereof.

BRIEF SUMMARY

Provided herein are methods for making block copolymers and block copolymers, embodiments of which may self-assemble, be easily ionized, or a combination thereof. In some embodiments, the block copolymers, especially thin films of the block copolymers, have one or more nanostructured charge mosaic surfaces. These nanostructure charge mosaic surfaces may be formed, at least in part, through thin film directed self-assembly of a neutral block copolymer followed by one or more selective treatments, e.g., vapor treatments, that ionize one or more particular domains.

In some embodiments, methods of preparing block copolymers are provided. In some embodiments, the methods include (i) providing a compound of formula (I)—

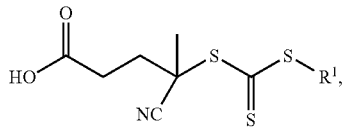

formula (I)

wherein $R^1$ is selected independently from a $C_1$-$C_{20}$ hydrocarbyl; (ii) providing a compound of formula (II)—

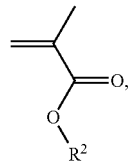

formula (II)

wherein $R^2$ is selected independently from a $C_1$-$C_{20}$ hydrocarbyl; (iii) contacting the compound of formula (I) and the compound of formula (II) to form an intermediate polymer; and (iv) contacting the intermediate polymer with vinylpyridine, such as 4-vinylpyridine, to form the block copolymer.

In another aspect, block copolymers are provided. In some embodiments, the block copolymers have a structure according to the following formula:

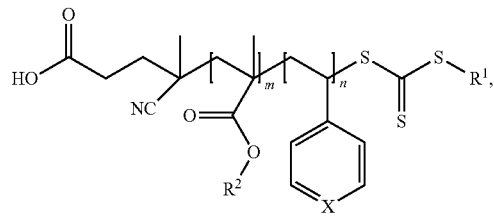

wherein $R^1$ is selected independently from a $C_1$-$C_{20}$ hydrocarbyl, each $R^2$ is selected independently from the group consisting of hydrogen and a $C_1$-$C_{20}$ hydrocarbyl, each X is selected independently from N or $N^+R^3$, wherein $R^3$ is selected independently from a $C_1$-$C_{20}$ hydrocarbyl, and m and n are selected independently from an integer from 1 to 10,000.

In yet another aspect, thin films are provided. In some embodiments, the thin films include a block copolymer as described herein. In some embodiments, the thin films include a plurality of first regions, and the first regions may be in the form of hexagonally-packed cylinders. The thin films may be used as membranes in a number of applications.

In a further aspect, methods of forming thin films are provided. In some embodiments, the methods of forming thin films include providing a block copolymer having the following structure—

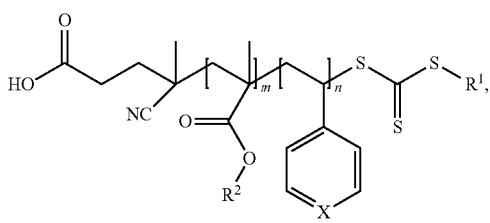

wherein $R^1$ is selected independently from a $C_1$-$C_{20}$ hydrocarbyl, $R^2$ is selected independently from a $C_1$-$C_{20}$ hydrocarbyl, X is N, and m and n are selected independently from an integer from 1 to 10,000; and disposing the block copolymer on a substrate to form the thin film. In some embodiments, the methods also include (i) contacting the thin film with an amount of a quaternizing agent, such as a haloalkyl, effective to quaternize at least one X to $N^+R^3$, wherein $R^3$ is selected independently from a $C_1$-$C_{20}$ hydrocarbyl, (ii) contacting the thin film with an amount of a hydrolyzing agent, such as a halide, effective to hydrolyze at least one methacrylate monomer to convert at least one $R^2$ to hydrogen, or
(iii) a combination thereof.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
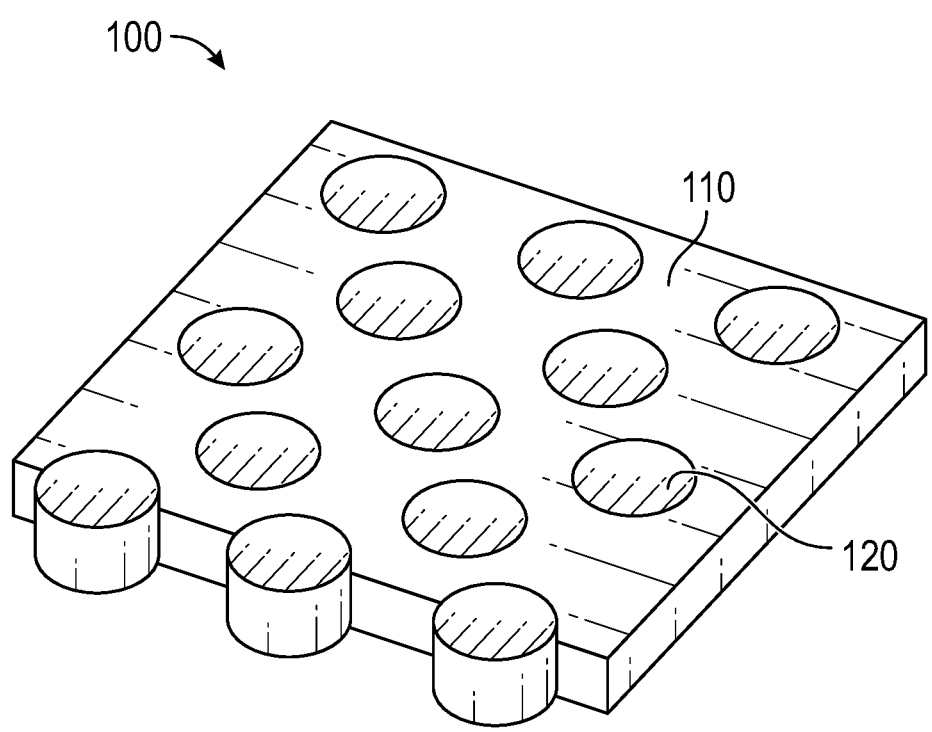
FIG. 1 depicts an embodiment of a thin film.

Provided herein are block copolymers, thin films that include block copolymers, and methods for forming block copolymers and/or thin films that include block copolymers.

Methods

In some embodiments, the methods for producing block copolymers include providing a compound of formula (I)—

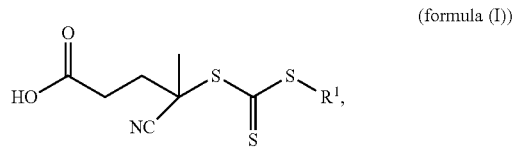

(formula (I))

wherein $R^1$ is selected independently from a $C_1$-$C_{20}$ hydrocarbyl. Although formula (I) and compounds thereof are depicted as including a carboxylic acid moiety, the formula encompasses and reads on the conjugate base of the carboxylic acid moiety or, in other words, a carboxylate moiety.

In some embodiments, $R^1$ of formula (I) is a linear $C_1$-$C_{20}$ hydrocarbyl, a linear $C_5$-$C_{15}$ hydrocarbyl, or a linear $C_{10}$-$C_{15}$ hydrocarbyl. In some embodiments, $R^1$ of formula (I) is an unsubstituted linear $C_1$-$C_{20}$ hydrocarbyl, an unsubstituted linear $C_5$-$C_{15}$ hydrocarbyl, or an unsubstituted linear $C_{10}$-$C_{15}$ hydrocarbyl.

In some embodiments, the compound of formula (I) is 4-cyano-4-[(dodecylsulfanyl-thiocarbonyl)sulfanyl]pentanoic acid (CDPA):

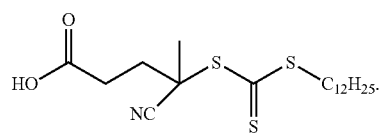

In some embodiments, the methods include providing a compound of formula (II)—

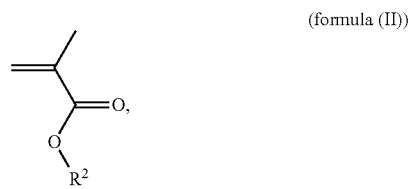

(formula (II))

wherein $R^2$ is selected independently from a $C_1$-$C_{20}$ hydrocarbyl.

In some embodiments, $R^2$ of formula (II) is a branched $C_1$-$C_{10}$ hydrocarbyl, a branched $C_1$-$C_5$ hydrocarbyl, or a branched $C_3$-$C_5$ hydrocarbyl. In some embodiments, $R^2$ of formula (II) is an unsubstituted branched $C_1$-$C_{10}$ hydrocarbyl, an unsubstituted branched $C_1$-$C_5$ hydrocarbyl, or an unsubstituted branched $C_3$-$C_5$ hydrocarbyl.

In some embodiments, the compound of formula (II) is t-butylmethacrylic acid (tBMA):

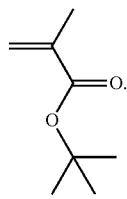

In some embodiments, the methods include contacting a compound of formula (I) with a compound of formula (II) to form an intermediate polymer. The intermediate polymer may or may not be isolated from a reaction medium in which the compound of formula (I) and the compound of formula (II) are contacted.

A compound of formula (I) may be contacted with any mol ratio of a compound of formula (II). In some embodiments, the mol ratio is about 1:200 to about 1:400 (formula (I):formula (II). In some embodiments, the mol ratio is about 1:250 to about 1:350 (formula (I):formula (II)). In some embodiments, the mol ratio is about 1:250 to about 1:300 (formula (I):formula (II)). In some embodiments, the mol ratio is about 1:270 to about 1:290 (formula (I):formula (II)). In some embodiments, the mol ratio is about 1:280 (formula (I):formula (II)).

In some embodiments, the methods include contacting an intermediate polymer with vinylpyridine, such as 4-vinylpyridine, to form a block copolymer. An intermediate polymer may be contacted with any mol ratio of vinylpyridine. In some embodiments, the mol ratio is about 1:400 to about 1:600 (intermediate polymer:vinylpyridine). In some embodiments, the mol ratio is about 1:450 to about 1:550 (intermediate polymer:vinylpyridine). In some embodiments, the mol ratio is about 1:480 to about 1:520 (intermediate polymer:vinylpyridine). In some embodiments, the mol ratio is about 1:500 (intermediate polymer:vinylpyridine). In some embodiments, the contacting of an intermediate polymer with vinylpyridine occurs in the presence of a radical initiator, such as azobisisobutyronitrile (AIBN).

Also provided herein are methods of forming a thin film of a block copolymer, or a thin film that includes a block copolymer. The thin films may include a thin film of a self-assembled block copolymer. As used herein the phrase "self-assembled block copolymer" refers to a block copolymer in which at least a portion of the block copolymer (e.g., a homopolymer block thereof) assumes, at any point, a particular physical configuration, such as the "hexagonally-packed cylinders" that are present in some embodiments herein. In some embodiments, the methods include (i) providing a block copolymer (BCP) having the following structure—

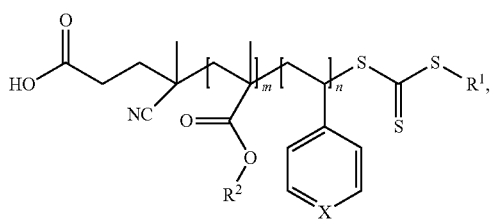

wherein $R^1$ is selected independently from a $C_1$-$C_{20}$ hydrocarbyl, $R^2$ is selected independently from a $C_1$-$C_{20}$ hydrocarbyl, X is N, and m and n are selected independently from an integer from 1 to 10,000; and (ii) disposing the block copolymer on a substrate to form the thin film. The substrate may be formed of any material, such as an inert material.

In some embodiments, the methods include contacting a block copolymer or a thin film with a quaternizing agent, such as a haloalkyl. As used herein, the term "quaternize" refers to converting a pyridinyl nitrogen heteroatom to $N^+R^3$, as described herein. In some embodiments, a block copolymer is contacted with an amount of a quaternizing agent, such as a haloalkyl, effective to quaternize at least one pyridinyl nitrogen to $N^+R^3$, wherein $R^3$ is selected independently from a $C_1$-$C_{20}$ hydrocarbyl. As used herein, the term "haloalkyl" refers to any halo-substituted $C_1$-$C_{20}$ hydrocarbyl. The haloalkyl may be in the form of a vapor. In some embodiments, the haloalkyl includes bromoethane. In some embodiments, a block copolymer is contacted with an amount of a quaternizing agent, such as a haloalkyl, effective to quaternize at least 25 mol %, at least 50 mol %, at least 75 mol %, or at least 99 mol % of the pyridinyl nitrogens of a block copolymer to $N^+R^3$, wherein $R^3$ is selected independently from a $C_1$-$C_{20}$ hydrocarbyl.

In some embodiments, the methods include contacting a block copolymer or a thin film with a hydrolyzing agent, such as a halide (e.g., $Cl^-$). As used herein, the term "hydrolyze" refers to converting an alkyl ether to a carboxylic acid or its conjugate base. In some embodiments, the methods include contacting a block copolymer or a thin film with an amount of a hydrolyzing agent, such as a hydrogen halide, effective to hydrolyze at least one methacrylate monomer by converting at least one $R^2$ to hydrogen, as described herein. In some embodiments, the methods include contacting a block copolymer or a thin film with an amount of a hydrolyzing agent, such as a hydrogen halide, effective to hydrolyze at least 25 mol %, at least 50 mol %, at least 75 mol %, or at least 99 mol % of the methacrylate monomers of a block copolymer by converting at least one $R^2$ to hydrogen, as described herein.

In some embodiments, a block copolymer is quaternized, hydrolyzed, or both. When a block copolymer is both quaternized and hydrolyzed, these treatments may be performed sequentially, in any order, or at least partially simultaneously.

Block Copolymers and Thin Films

Also provided herein are block copolymers, including block copolymers capable of self-assembly. In some embodiments, the block copolymers have a structure according to the following formula:

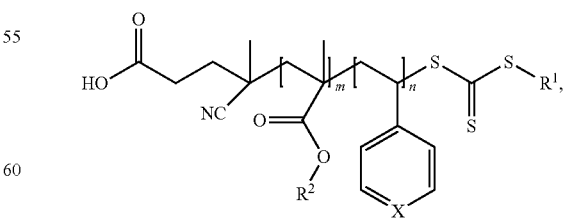

wherein $R^1$ is selected independently from a $C_1$-$C_{20}$ hydrocarbyl, each $R^2$ is selected independently from the group consisting of hydrogen and a $C_1$-$C_{20}$ hydrocarbyl, each X is selected independently from N or $N^+R^3$, wherein each $R^3$ is selected independently from a $C_1$-$C_{20}$ hydrocarbyl, and m and n are selected independently from an integer from 1 to 10,000.

In some embodiments, $R^1$ is an unsubstituted linear $C_{12}$ hydrocarbyl, $R_2$ is t-butyl, X is N, and the block copolymer has the following structure:

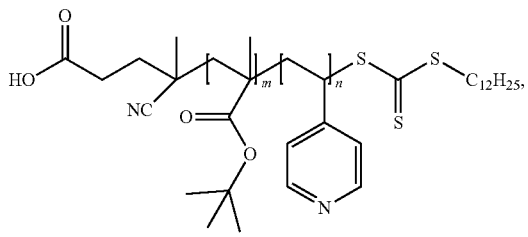

wherein m and n are selected independently from an integer from 1 to 10,000.

In some embodiments, m is an integer from about 100 to about 5,000, about 100 to about 4,000, about 100 to about 3,000, about 100 to about 2,000, about 100 to about 1,000, about 100 to about 600, about 100 to about 500, about 200 to about 400, about 200 to about 300, or about 280.

In some embodiments, n is an integer from about 100 to about 5,000, about 100 to about 4,000, about 100 to about 3,000, about 100 to about 2,000, about 100 to about 1,000, about 200 to about 800, about 400 to about 600, about 450 to about 550, or about 500.

In some embodiments, m is an integer from about 100 to about 5,000, about 100 to about 4,000, about 100 to about 3,000, about 100 to about 2,000, about 100 to about 1,000, about 100 to about 600, about 100 to about 500, about 200 to about 400, about 200 to about 300, or about 280; and n is an integer from about 100 to about 5,000, about 100 to about 4,000, about 100 to about 3,000, about 100 to about 2,000, about 100 to about 1,000, about 200 to about 800, about 400 to about 600, about 450 to about 550, or about 500.

In some embodiments, the ratio of m to n is about 1:1 to about 1.5:1, or about 1.25:1.

Also provided herein are thin films that include or consist of one or more of the block copolymers described herein. The films may have any thickness, such as 10 nm to 10 mm.

The thin films may include one or more regions that include a portion of a block copolymer, such as a homopolymer block of a block copolymer. The one or more regions may have any physical configuration, and the one or more regions may form via self-assembly of at least a portion of a block copolymer.

In some embodiments, a thin film includes at least one first region that includes or consists of a polyvinylpyridine portion of the block copolymer. A polyvinylpyridine portion may include at least monomer wherein X is $N^+R^3$. In some embodiments, the thin film includes a plurality of the first regions, and the first regions are in the form of hexagonally-packed cylinders, as depicted at FIG. 1. FIG. 1 depicts an embodiment of a thin film 100 that includes a plurality of first regions 120 that are hexagonally-packed cylinders formed of a polyvinylpyridine portion of the block copolymer. The plurality of first regions 120 of FIG. 1 are dispersed in a matrix 110 formed of a poly-methacrylate portion (e.g., a portion including a monomer of formula (II)) of the block copolymer. The poly-methacrylate portion may include at least one monomer wherein $R^2$ is hydrogen. Although hexagonally-packed cylinders are depicted at FIG. 1, other physical configurations of the first regions are envisioned.

Due to the presence of the at least one first region, nanostructure surfaces may be created on one or more surfaces of the thin films described herein. The creation of nanostructure surfaces of opposite charge may permit the direct patterning of one or more additives on a thin film. The additives may include nanoparticles. The thin films may include anti-bacterial coatings.

When used herein with regard to the selection of a substituent, the term "independently" indicates that (i) a substituent at a particular location may be the same or different for each molecule of a formula (e.g., a compound of formula (I) may include two molecules of formula (I), with each molecule having the same or a different $C_1$-$C_{20}$ hydrocarbyl selected for $R^1$), and/or (ii) two differently labeled substituents selected from the same pool of substituents may be the same or different (e.g., $R^1$ and $R^2$ of a block copolymer may both be selected from "a $C_1$-$C_{20}$ hydrocarbyl", and the $C_1$-$C_{20}$ hydrocarbyls selected for $R^1$ and $R^2$ may be the same or different).

The phrases "$C_1$-$C_{20}$ hydrocarbyl," and the like, as used herein, generally refer to aliphatic, aryl, or arylalkyl groups containing 1 to 20 carbon atoms. Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having 1 to about 20 carbon atoms. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, tolyl, xylyl, mesityl, benzyl, and the like, including any heteroatom substituted derivative thereof.

Unless otherwise indicated, the term "substituted," when used to describe a chemical structure or moiety, refers to a derivative of that structure or moiety wherein one or more of its hydrogen atoms is substituted with a chemical moiety or functional group such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkylNHC(O)alkyl), tertiary amine (such as alkylamino, arylamino, arylalkylamino), aryl, aryloxy, azo, carbamoyl (—NHC(O)O-alkyl- or —OC(O)NH-alkyl), carbamyl (e.g., CONH$_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —CCl$_3$, —CF$_3$, —C(CF$_3$)$_3$), heteroalkyl, isocyanate, isothiocyanate, nitrile, nitro, phosphodiester, sulfide, sulfonamido (e.g., SO$_2$NH$_2$), sulfone, sulfonyl (including alkylsulfonyl, arylsulfonyl and arylalkylsulfonyl), sulfoxide, thiol (e.g., sulfhydryl, thioether) or urea (—NHCONH-alkyl-).

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When block copolymers, thin films, or methods are claimed or described in terms of "comprising" various steps or components, the block copolymers, thin films, or methods can also "consist essentially of" or "consist of" the various steps or components, unless stated otherwise.

The terms "a," "an," and "the" are intended to include plural alternatives, e.g., at least one. For instance, the disclosure of "a thin film," "a block copolymer," "a monomer", and the like, is meant to encompass one, or mixtures or combinations of more than one thin film, block copolymer, monomer, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, that the ratio of m to n is about 1:1 to about 1.5:1. This range should be interpreted as encompassing about 1:1 and about 1.5:1, and further encompasses "about" each of 1.1:1, 1.2:1, 1.3:1, and 1.4:1, including any ranges and sub-ranges between any of these values.

As used herein, the term "about" means plus or minus 10% of the numerical value of the number with which it is being used.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Synthesis of Block Copolymer

In this example, an embodiment of a block copolymer was made according to the following scheme, which depicts a reversible addition-fragmentation chain-transfer (RAFT) process.

Scheme 1. RAFT synthesis of poly(4-vinylpyridine)-b-poly(tert-butyl methacrylate) (P4VP-b-PtBMA) from 4-cyano-4-[(dodecylsulfanylthiocarbonyl)sulfanyl]pentanoic acid (CDPA).

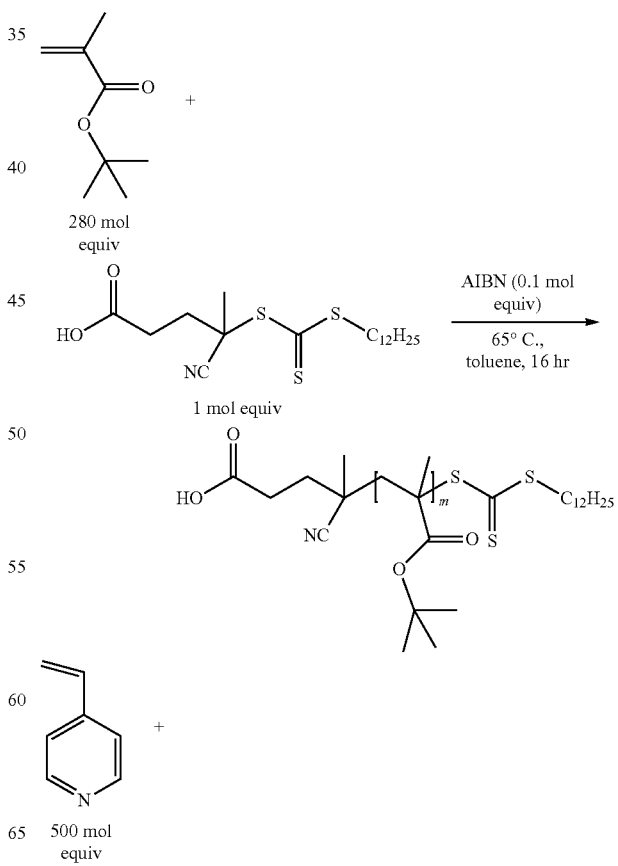

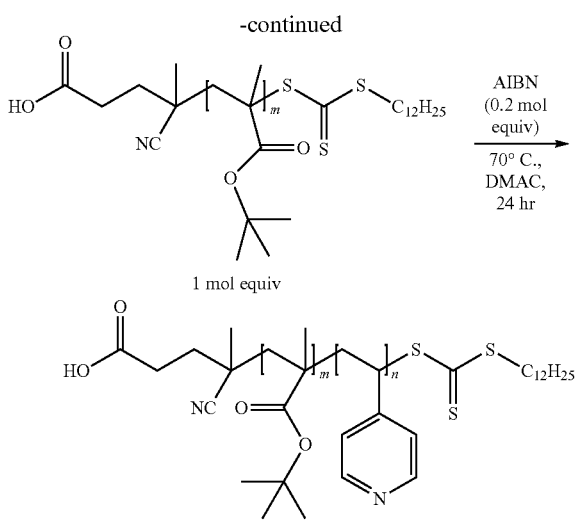

n-Dodecanethiol (15.4 g, 76 mmol) was added via addition funnel over 10 minutes to a 500 mL round bottom flask (RBF) equipped with a PTFE stir bar and containing a stirring suspension of NaH (60% in mineral oil) (3.28 g, 82 mmol) in 150 mL DEE (diethyl ether) at 0° C. The solution was stirred at 0° C. for 30 minutes, and then refluxed for 1 hour. The solution was then cooled to 0° C., and the white slurry was diluted with 150 mL of DEE. Carbon disulfide (6.03 g, 79 mmol) was added via addition funnel, and then stirred for 30 minutes at 0° C., creating a yellow slurry of sodium dodecyltrithiocarbonate.

Solids were collected via vacuum filtration and dried en vacuo at 25° C. overnight. No further purifications were performed (12.6 g yield, 56%). A suspension of sodium dodecyltrithiocarbonate (12.6 g, 42 mmol) in 150 mL DEE was added to a 300 mL RBF and titrated in small portions with iodine (5.4 g, 0.21 mmol) over 2 hours.

The end point was observed when the solution changed from yellow to dark yellow/brown in addition to precipitation of white sodium iodide salt. After further stirring for 1 hour, the salt was removed by filtration and the filtrate added to separatory funnel. Following 3 extractions with a 0.5 N sodium thiosulfate solution (aq) and 2 extractions with DI (deionized) water, the organic layer was collected and dried over $MgSO_4$.

The product oil, bis-(dodecylsulfanylthiocarbonyl) disulfide, was concentrated via rotary evaporation and dried en vacuo at 25° C. overnight. Bis-(dodecylsulfanylthiocarbonyl disulfide) (3.73 g, 6.7 mmol) and 4,4'-azobis(4-cyanopentanoic acid) (2.82 g, 10 mmol) was dissolved in 150 mL of ethyl acetate followed by refluxing for 18 hours. The solution was added to a separatory funnel and washed 4 times with 50 mL of DI water and one final time with a brine solution before collecting the organic layer and drying over $MgSO_4$.

The product was concentrated via rotary evaporation followed by recrystallization from hexanes to product the pure CDPA as a yellow solid. $^1H$ NMR confirmed the product structure: ($^1H$ NMR 400 MHz, 25° C., $CDCl_3$), δ (ppm) =3.35 (t, 2H), 2.71 (m, 2H), 2.62-2.34 (m, 2H), 1.90 (s, 3H), 1.71 (m, 2H), 1.4 (m, 2H), 1.33 (br s, 16H), 0.89 (t, 3H). ($^{13}C$ NMR 125 MHz, 25° C., $CDCl_3$) δ 216.81, 177.43, 118.92, 46.20, 37.11, 33.48, 31.93, 29.64, 29.57, 29.55, 29.44, 29.36, 29.09, 28.95, 27.68, 24.87, 22.72, 14.16.

Poly(tert-butyl methacrylate) (PtBMA), macro-CTA: Homopolymerization of t-butyl acrylate (tBA) (6.0 g, 42 mmol) using CDPA (60 mg, 0.15 mmol) and azobisisobutyronitrile (AIBN) (2.5 mg, 0.015 mmol) [280:1:0.1, respectively] in 4 mL of toluene. Contents were degassed by three freeze-pump-thaw cycles prior to heating at 65° C. for 16 hours under Ar. The reaction was then cooled and quenched with air.

Following additional dilution in toluene, the polymer was collected by precipitation into a 10-fold excess of MeOH at 0° C., filtering, and solids were dried at 70° C. under vacuum for 12 hours. Dry PtBMA (4.1 g, 68% yield) was confirmed by $^1H$ NMR, $^{13}C$ NMR, ATR-IR, and then analyzed by SEC using dn/dc=0.065 $mL/g^{54}$ in THF ($M_n$=51.0 kg $mol^{-1}$, Đ=1.04).

PtBMA-b-P4VP diblock polymer: 1.0 g of PtBMA macro-CTA (20 μmol) and 2.0 mL (18.5 mmol) of 4VP were dissolved within 7 mL of dimethylacetamide (DMAC) in a 25 mL Schlenk flask. A 5 mg/mL stock solution of AIBN in DMAC was used to inject 0.12 mL (4 μmol) for a 5:1 ratio of CTA:AIBN. After 3 freeze-pump-thaw cycles, the flask was backfilled with Ar and submerged into a preheated bath at 70° C.

The reaction was monitored by briefly cooling the reaction to 0° C. and retrieving an aliquot via degassed syringe under Ar. The aliquots were evaluated by $^1H$ NMR until the desired molar ratio of PtBMA:P4VP (1.5:1) was achieved (~24 hours).

The viscous orange solution was cooled and quenched by exposure to air and dilution with clean THF. The product was purified by triplicate precipitations in 10-fold excess of $MeOH/H_2O$ mixture (80/20 v/v) and redissolutions in clean THF. The final collection by filtration and drying for 12 hours at 70° C. under vacuum produced the dry pale-orange powder prior to characterizations described below.

BP Design and Characterization: The PtBMA-b-P4VP sample was characterized by $^1H$ NMR to determine the molar ratio of each segment through comparative integration of the aryl P4VP protons (8.1-8.5 ppm, 2H, and 6.0-6.75 ppm, 2H) with the total region of the aliphatic proton peaks (0.75-2.25 ppm, 17H).

The integration value of the aliphatic region was corrected to account for the 3 aliphatic protons within the P4VP repeating unit. Further characterization confirming the BCP was also performed using $^{13}C$ NMR, and ATR-IR. The molar ratio of PtBMA:P4VP repeating units within the purified product was determined as 1.25:1 by $^1H$ NMR which correlated to a PtBMA volume fraction ($f_{PtBMA}$) of 0.65 based on the densities of PtBMA (1.02 g $cm^{-3})^{55}$ and P4VP (1.11 g $cm^{-3})^{56}$ at 25° C. The asymmetry of these segments was predicted to result in hexagonally packed cylinders of P4VP within a matrix of PtBMA in accordance with a typical linear diblock polymer phase diagram (see, e.g., Matsen, M. et al. *Macromolecules* 1996, 29, 1091-1098; and Leibler, L. *Macromolecules* 1980, 13, 1602-1617).

Based on $M_n$ of the PtBMA macro-CTA (51.0 kg $mol^{-1}$), determined by multi-angle light scattering coupled with size exclusion chromatography (MALS-SEC), this equated to a P4VP segment of $M_n$=30 kg $mol^{-1}$ and a total Br⁻ $M_n$=81 kg $mol^{-1}$. SEC on the final BCP confirmed a monomodal peak shape by RI and an increase in molar mass (decrease in retention time), $M_n$=30 kg $mol^{-1}$, Đ=1.08 based on conventional column calibration with PS standards. The significant reduction in $M_n$ by SEC (30 kg $mol^{-1}$) versus NMR (81 kg $mol^{-1}$) was caused by favorable interactions between the P4VP and the column packing that increased the BCP retention time. Therefore, the NMR determined $M_n$ value was more rigorously justified.

A total volume-corrected degree of polymerization (N) of 1085 was calculated for the PtBMA-b-P4VP sample using the aforementioned densities of each segment and a reference volume of 118 Å$^3$ (see, e.g., Kennemur, J. G. et al. *Macromolecules* 2012, 45, 7228-7236).

To achieve microphase separation within the strong segregation regime (SSR) the product of N and the segment-segment effective interaction parameter, $\chi$, needed to be well above a minimum value of ~10.5 in accordance with mean field theory. About ~10.5 limits the order-disorder transition of $\chi$N for a symmetric Br$^-$ (f=0.5) and this value increased when moving towards higher asymmetry of the two segments. The effective $\chi$ between PtBMA and P4VP was unknown, however, if targeting $\chi$N>50 (well within the SSR)[57] with N=1085, $\chi$ would need to be ≥0.05. This value was reasonable based on previously determined $\chi$ values of P4VP with poly(methyl methacrylate) (PMMA) ($\chi_{P4VP-PMMA}$≈0.08 at 150° C.).[34] DSC analysis of of PtBMA-b-P4VP revealed two glass transition temperatures (T$_g$) at 105 and 129° C., which was a qualitative sign of microphase separated BCPs containing segments with dissimilar T$_g$ values. The T$_g$ of 105° C. was consistent with the PtBMA macro-CTA and the higher T$_g$ value of 129° C. was expected for P4VP (lit. ~142° C).[34] TGA analysis of PtBMA-b-P4VP displayed a two-step decomposition with ~30% mass loss at an onset temperature of 236° C. and the remaining mass loss at 338° C.

Example 2—Thin Film Preparation

Silicon wafers were prepared by submerging them in piranha solution for 2 hours at 150° C. Wafers were removed from solution and thoroughly rinsed with DI water before drying fully under a stream of N$_2$. A 20 mg/mL solution of polymer in CHCl$_3$ was spun cast onto each wafer at 3000 RPM for 30 seconds.

Vapor annealing treatment was performed by storing film-coated wafers in a sealed glass chamber along with 10 mL of CHCl$_3$ in a separate vial. The films were exposed to CHCl$_3$ vapor for 8 hours. The chamber seal was then opened and CHCl$_3$ was allowed to evaporate from the chamber before removing.

Solvent vapor annealing was an effective method for producing perpendicularly aligned morphologies on the surface of the thin films. To determine a good solvent choice for this technique, AFM images were taken following different solvent vapor treatments (THF, DMF, CHCl$_3$) with varying exposure and evaporation times. It was determined that about 8 hours of CHCl$_3$ vapor treatment followed by slow vapor purging of the chamber consistently produced a hexagonally-packed cylindrical morphology perpendicular to the air-film interface, as depicted at FIG. 1. FIG. 1 depicts an embodiment of a thin film 100 that included hexagonally-packed cylinders 120 disposed in a matrix 110.

The three-step approach of this example to transform the neutral, self-assembled, PtBMA-b-P4VP film into a charge-mosaic surface is illustrated at Scheme 2. For clarity in this example, a two-numbered identification system is used with the general formula of VP-MA(#-#) to describe films that have been subjected to varying degrees of these treatments. The numbers within parentheses describe the time, in hours, that the films were subjected to bromoethane and HCl vapor, respectively. All hydrolyzed samples were submerged into 0.01 M KOH (aq) to neutralize the PMAA domains.

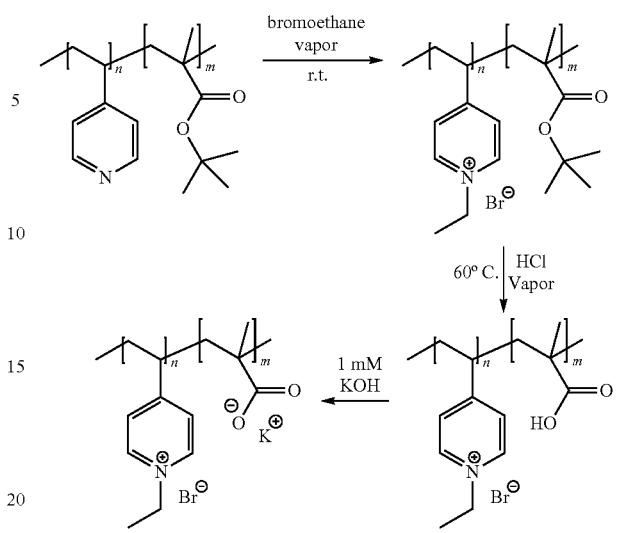

Scheme (2. Synthetic route to poly(ethyl-4-vinylpyridinium bromide)-b-poly(methacrylic acid potassium salt)from poly (4-vinyl pyridine)-b-poly(tert-butyl methacrylate).

Quaternization: Solvent annealed wafers were placed into a sealed glass chamber along with 10 mL of bromoethane in a separate vial. The chamber was sealed, and the wafers were exposed to bromoethane vapor for varying durations of 6 to 24 hours. After a set duration, the wafers were removed and dried at 50° C. under vacuum for 2 hours to remove excess bromoethane.

Treatment of the neutral film, VP-MA(0-0), with bromoethane vapor allowed selective reaction and partial quaternization of the P4VP repeating units into poly(ethyl-4-vinylpyridinium bromide), (P4VPq). Systematic bromoethane vapor treatments for varying times (6-24 hours) were performed. To gauge the effect of these treatments on the modification of the films, a combination of AFM imaging and water contact angle measurements were initially performed. After 6 hours of treatment, VP-MA(6-0), AFM revealed that the overall morphology of the thin film remained intact while the phase contrast between the P4VP cylinders and the PtBMA matrix was greatly increased when compared to VP-MA(0-0).

The improved contrast was attributed to the presence of large halide counter-ions following quaternization, which also was concluded for the collected images. Comparison of contact angle measurements on VP-MA(0-0) and VP-MA (6-0) revealed only a minor reduction in contact angle from 100° to 98°. By contrast, bromoethane vapor treatment of the film for 24 hours, VP-MA(24-0) resulted in a substantial reduction in contact angle to 79°. AFM analysis of VP-MA (24-0) revealed that the film and morphology remained intact, however, noticeable swelling of the P4VP cylinders occurred. This could be explained by the increasing volume of the cylinders as P4VPq expanded the domains to include ethyl groups and bromine counter anions at longer treatment times.

In order to determine the quaternization through the depth of the films, time-of-flight secondary ion mass spectrometry (ToF-SIMS) was used, which was used to determine subsurface film characteristics of each block as well as associated counterions that were present. While AFM and contact angle measurements provided qualitative conclusions on the successful quaternization of P4VP, ToF-SIMS provided an approach for detecting bromide anions within the films. ToF-SIMS measurements were initially performed on homopolymer thin films of P4VP and PtBMA cast on silicon wafers to determine the characteristic ion fragments for each polymer.

Figure 2A:
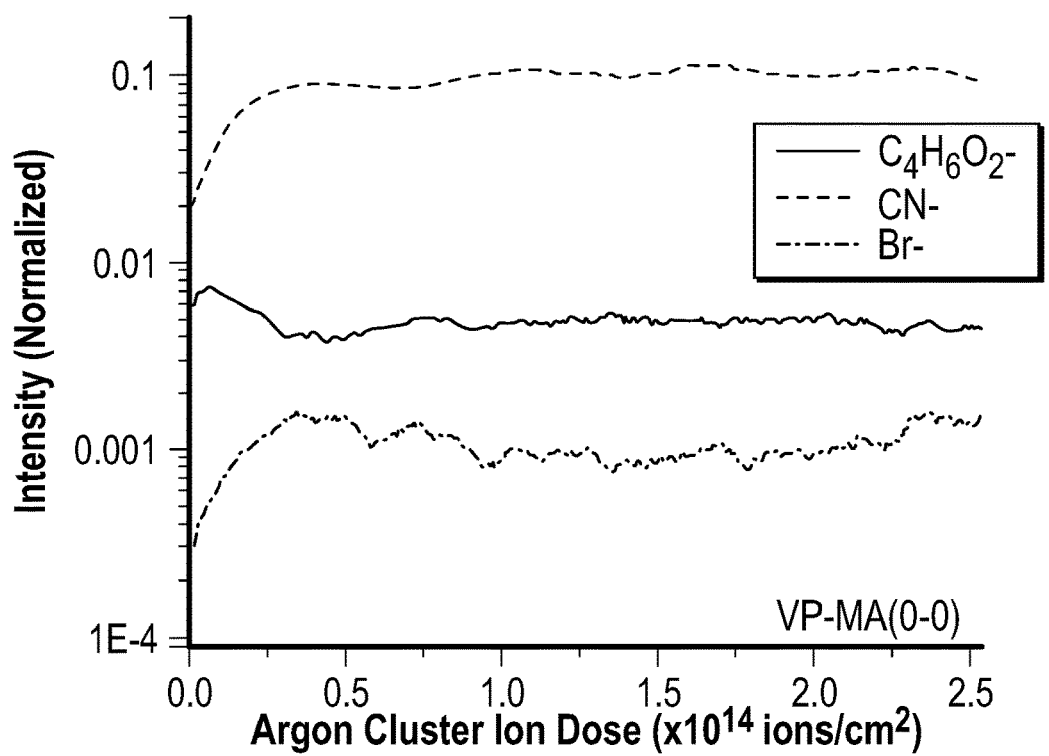
FIG. 2A depicts the normalized intensity of negative ion detection as a function of ion dose for an untreated embodiment of a block copolymer.

These films were prepared identically to the foregoing VP-MA(0-0). A major anion fragment associated with each BCP segment was the cyanide anion (CN$^-$) for P4VP while for PtBMA, a $C_4H_6O_2^-$ fragment was dominant. ToF-SIMS on VP-MA(0-0) revealed the characteristic CN$^-$ and $C_4H_6O_2^-$ fragments of both segments along with a baseline bromide (BP) ion signal for an untreated film (FIG. 2A). The move from lower to higher values of argon cluster ion dose (ions cm$^{-2}$) along the x-axis in FIG. 2A-AD was directly correlated with analyzing the film composition from the air interface to the silicon substrate interface, respectively. The data cutoff once the silicon substrate was reached could be identified by a sharp increase in Si$^-$ and SiO$_2^-$ fragments.

Figure 2B:
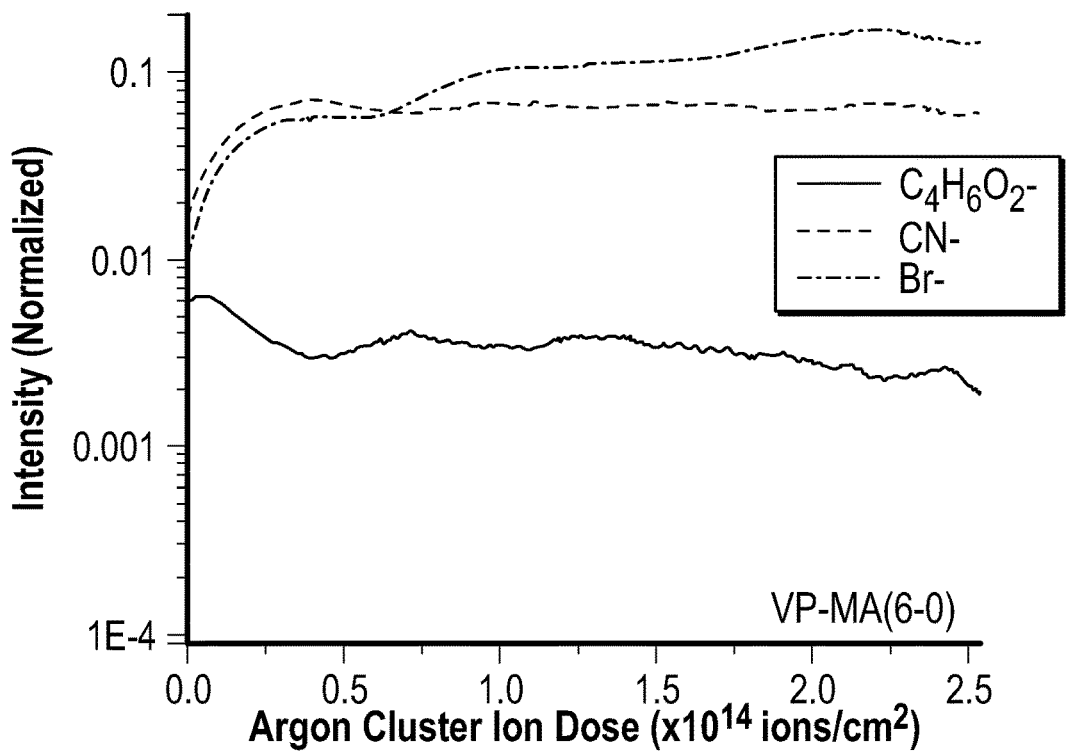
FIG. 2B depicts the normalized intensity of negative ion detection as a function of ion dose for an embodiment of a block copolymer quaternized for 6 hours.
Figure 2C:
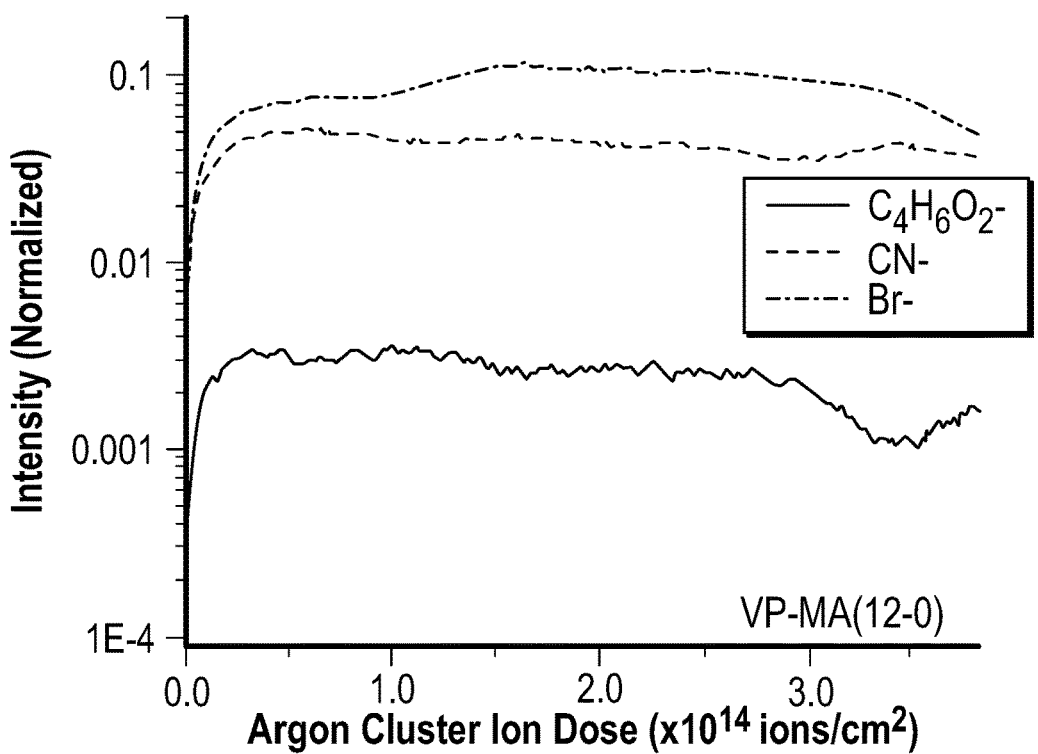
FIG. 2C depicts the normalized intensity of negative ion detection as a function of ion dose for an embodiment of a block copolymer quaternized for 12 hours.
Figure 2D:
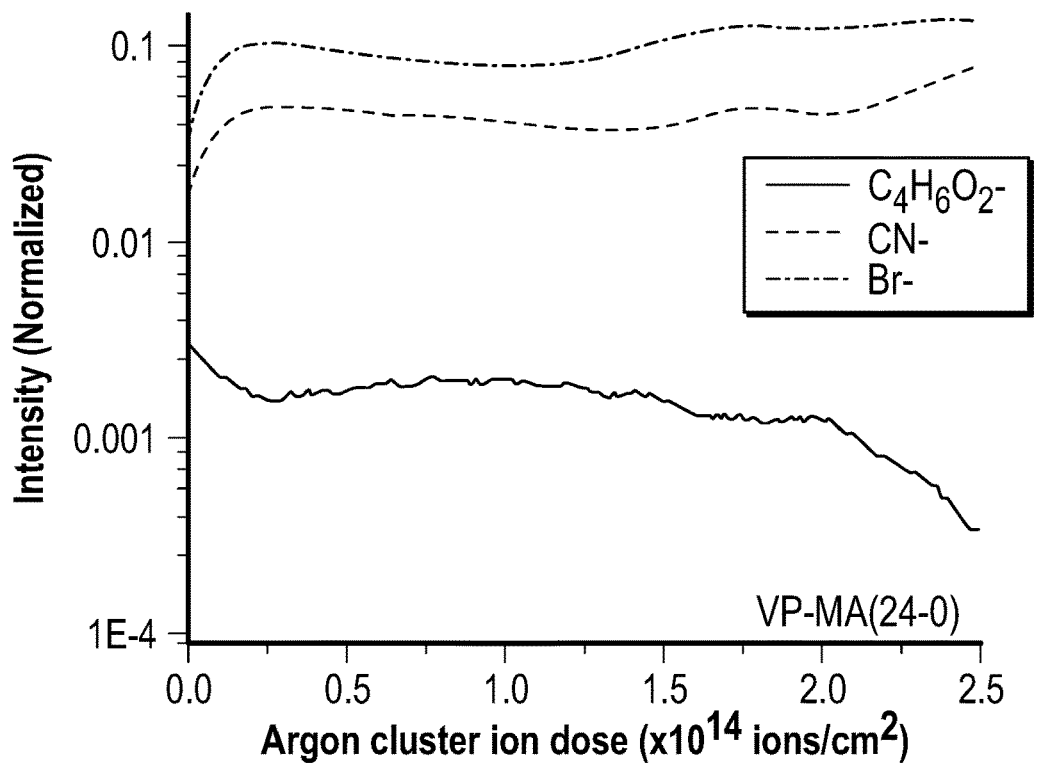
FIG. 2D depicts the normalized intensity of negative ion detection as a function of ion dose for an embodiment of a block copolymer quaternized for 24 hours.

The normalized intensity of negative ion detection as a function of ion dose determined by ToF-SIMS in negative ion mode is depicted at FIG. 2A for untreated (neutral) copolymer, VP-MA(0-0), at FIG. 2B after a 6 hour quaternization, VP-MA(6-0), at FIG. 2C after a 12 hour quaternization, VP-MA(12-0), and at FIG. 2D after a 24 hour quaternization, VP-MA(24-0). Intensities were normalized with point to point method using 10 neighboring points.

ToF-SIMS analysis on VP-MA(6-0) revealed many of the relative anion signals remained the same except the bromide anion increased significantly when compared to VP-MA(0-0) (FIG. 2B). This was evidence that quaternization within the P4VP domains occurred after the vapor treatment. The Br$^-$ intensity increased when analyzing deeper into the thin film, indicating that P4VPq was created, or has migrated to, deeper within the film. The lower quantity of P4VPq at the film surface may be why VP-MA(6-0) had only a minor decrease in contact angle measurement compared to VP(0-0). Identical ToF-SIMS analysis on VP-MA(12-0) and VP-MA(24-0) (FIG. 2C and FIG. 2D) revealed a saturation in Br intensity and an increasing quantity of quaternization present near the air interface. For VP-MA(24-0), an initial peak of intensity at low Ar cluster ion doses was consistent with the surface swelling or "blooming" of P4VPq cylinders seen FIG. 1. The result of longer bromoethane vapor treatment for VP-MA(24-0) also revealed higher and more homogenous levels of P4VPq through matched intensity oscillations between the CN$^-$ and the Br$^-$ signals when traversing down the film. These matched oscillations corroborated that the Br$^-$ anions resided within the P4VP domains of the BCP.

Hydrolysis and Neutralization: For partial hydrolysis of PtBMA domains to poly(methyl acrylic acid) (PMAA), select films were suspended in a custom-designed glass apparatus consisting of a small glass insert within a 75 mL pressure flask. The films were suspended within the headspace of a vial containing ~4 mL of concentrated HCl at 60° C. for known time periods (1-4 hours). Films were then removed and dried at 50° C. under vacuum for 12 hours. Following drying, films were briefly submerged (~15 s) into a 0.01 M KOH solution before being submerged multiple times into a series of DI water solutions (10 dips each) to remove excess salt. Excess water was removed gently with a stream of N$_2$ and films were fully dried at 50° C. under vacuum.

For investigations on the efficacy of creating charge mosaics through the hydrolysis and neutralization of the BP thin films, samples treated with short quaternization times (6 hours) were used. The film VP-MA(6-1) was exposed to HCl vapor for 1 hour, dried under vacuum, subsequently submerged into a 0.01 M KOH (aq) solution for ~15 seconds, and finally rinsed by brief submersions into clean DI water solutions. The same was true for VP-MA(6-2) and VP-MA (6-4) with the exception of longer HCl vapor annealing times of 2 hours and 4 hours, respectively.

Following a final drying, AFM confirmed the integrity of the films and their microphase separated morphology had remained intact throughout all treatments, although some surface roughening was evident. A notable observation was the inverted contrast profiles of the height and phase image of these films compared to the above-described films. For the height image, the P4VP cylinders were now resolved as dark areas while the matrix was bright. The opposite was true for the phase image.

AFM height images, phase images, and contact angle of films were collected after a 6 hour bromoethane vapor treatment and varying HCl vapor treatment durations. The film "VP-MA(6-1)" was subjected to a 1 hour treatment with HCl vapor and 0.01 M KOH. The film "VP-MA(6-2)" was subjected to a 2 hour treatment with HCl vapor and 0.01 M KOH. The film "VP-MA(6-4)" was subjected to a 4 hour treatment with HCl vapor and 0.01 M KOH.

An inversion of the image contrast was a good indication that there were differences in electrostatic interactions between the piezoelectric tip of the AFM cantilever from the newly charged PMAA domains. The PtBMA domains likely had been swollen through their conversion to PMAA. Contact angle measurements revealed a gradual decrease in water droplet angle as a function of longer HCl vapor treatments and all of the films had lower contact angles than VP-MA(6-0). The results of contact angle measurements performed on various films are provided in Table 1.

TABLE 1

Contact angles of P4VP-b-PtBMA thin films with varying quaternization and hydrolysis conditions.

| Sample ID[a] | Quaternization rxn time (h) | Hydrolysis rxn time (h)[c] | KOH treatment | Contact angle (degrees)[b] |
|---|---|---|---|---|
| VP-MA(0-0) | 0 | 0 | N | 100.0 |
| VP-MA(6-0) | 6 | 0 | N | 97.6 |
| VP-MA(12-0) | 12 | 0 | N | 81.0 |
| VP-MA(24-0) | 24 | 0 | N | 79.0 |
| VP-MA(6-1) | 6 | 1 | Y | 81.2 |
| VP-MA(6-2) | 6 | 2 | Y | 77.8 |
| VP-MA(6-4) | 6 | 4 | Y | 73.2 |

[a] All samples in the sample set were created from the same parent polymer. Samples are named using a binary number system to identify the varying quaternization and hydrolysis conditions. For Sample ID, numerical values (x-y), "x" is the quaternization time in h., "y" is the HCl vapor treatment time in h.
[b] The contact angles reported are the average of both the left and right angle values obtained from the instrument measurements.
[c] All hydrolyzed samples were subjected to KOH treatment.

Figure 3A:
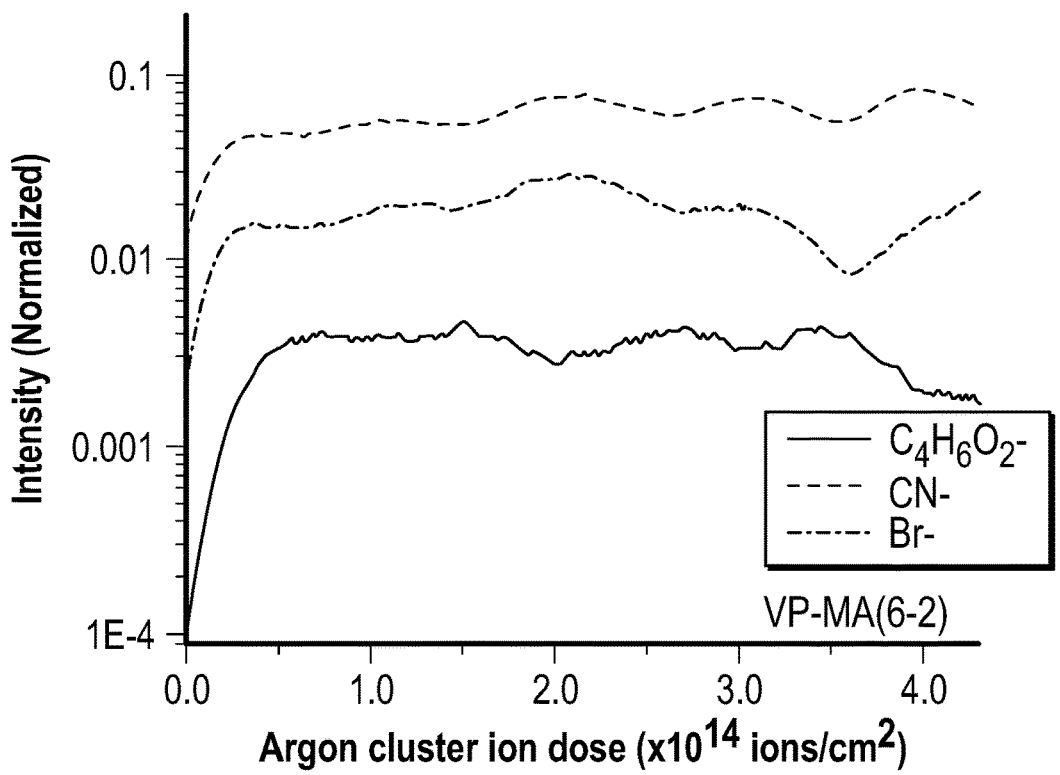
FIG. 3A depicts the normalized intensity of negative ion detection as a function of ion dose for an embodiment of a block copolymer subjected to a 6 hour quaternization followed by a 2 hour hydrolysis and KOH treatment.
Figure 3B:
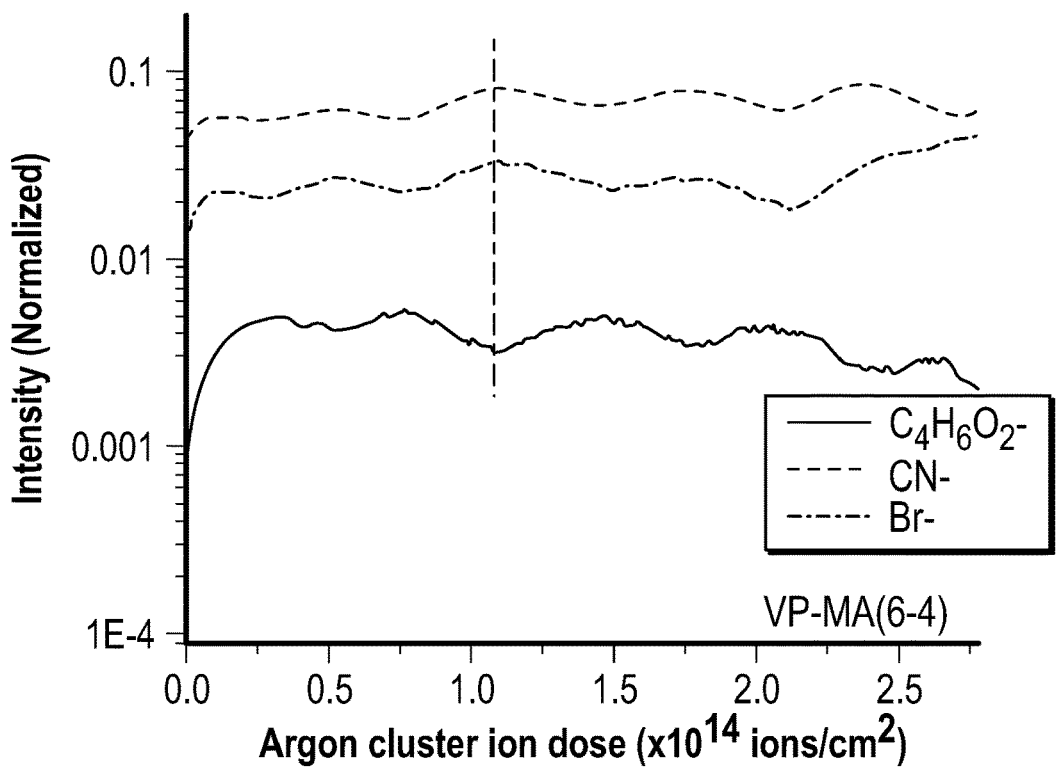
FIG. 3B depicts the normalized intensity of negative ion detection as a function of ion dose for an embodiment of a block copolymer subjected to a 6 hour quaternization followed by a 4 hour hydrolysis and KOH treatment.

Negative ion mode ToF-SIMS analysis of VP-MA(6-2) and VP-MA(6-4) showed an increase in composition oscillations (FIG. 3A, FIG. 3B). FIG. 3A and FIG. 3B depict the normalized intensity of negative ion detection as a function of ion dose determined by ToF-SIMS in negative ion mode for a film subjected to a 6 hour quaternization followed by 2 h hydrolysis and KOH treatment (VP-MA(6-2)) (FIG. 3A), and a film subjected to a 6 hour quaternization followed by 4 h hydrolysis and KOH treatment (VP-MA(6-4)) (FIG. 3B). Intensities were normalized with point to point method using 10 neighboring points. The vertical dashed line is a guide to the eye to show the in-phase and out-of-phase composition fluctuations.

Although it was difficult to identify the exact cause of these fluctuations, it was hypothesized that the various film treatments may have resulted in reorientation of the P4VP cylinders or possibly morphological transitions throughout the film. Nevertheless, the $Br^-$ and $CN^-$ ions oscillated directly in-phase with each other while the $C_4H_6O_2^-$ ions were oppositely out-of-phase. This corroborated microphase separation remained throughout the film and the selective location of the $Br^-$ ions within the P4VPq domains.

Positive ion mode ToF-SIMS analysis (FIG. 4A, FIG. 4B, FIG. 4C, and FIG. 4D) allowed the observation of cations through the treated films. Untreated homopolymers of P4VP and PtBMA were first analyzed to determine major cation fragments for each segment. For P4VP, a $C_7H_8N^+$ ion was prominent while $C_8H_{13}O_2^+$ was the prominent peak for PtBMA.

Figure 4A:
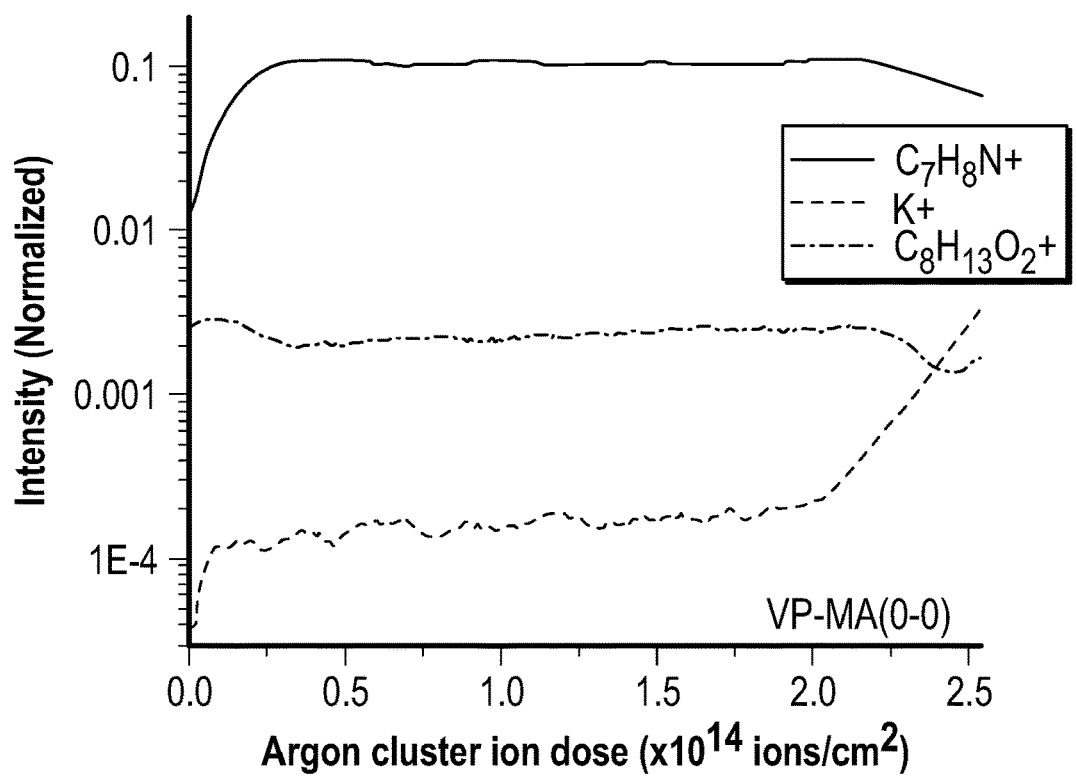
FIG. 4A depicts the normalized intensity of positive ion detection as a function of ion dose determined for an embodiment of an untreated block copolymer.
Figure 4B:
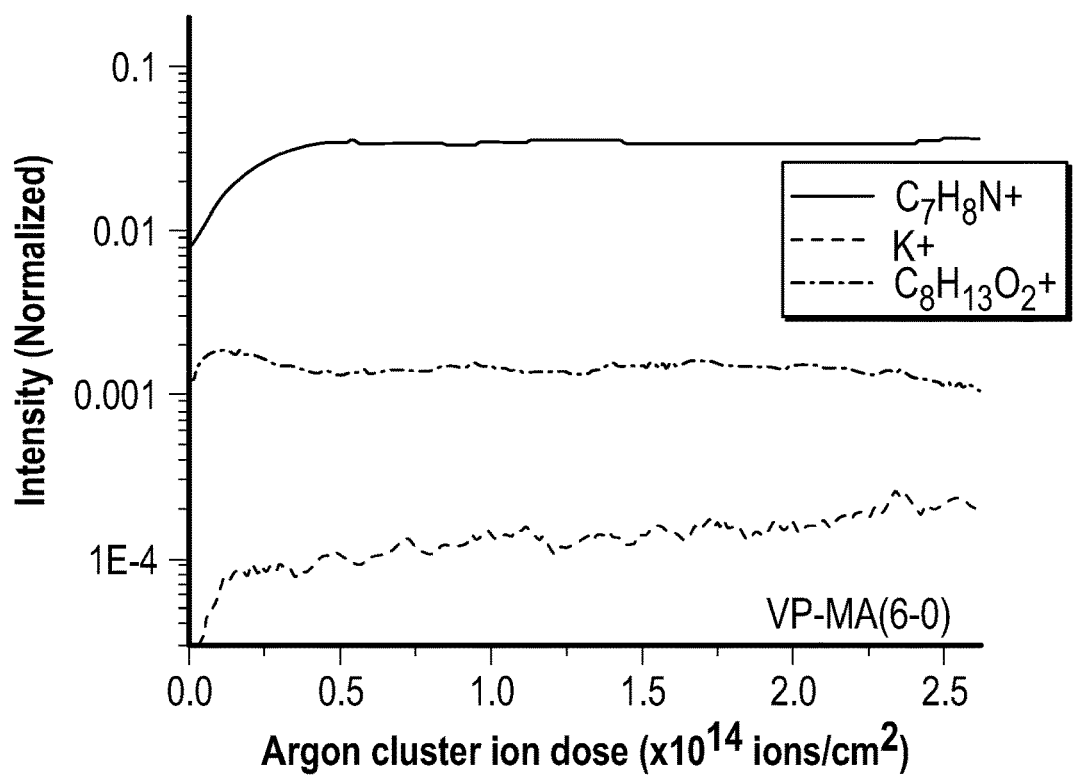
FIG. 4B depicts the normalized intensity of positive ion detection as a function of ion dose determined for an embodiment a copolymer subjected to a 6 hour quaternization.
Figure 4C:
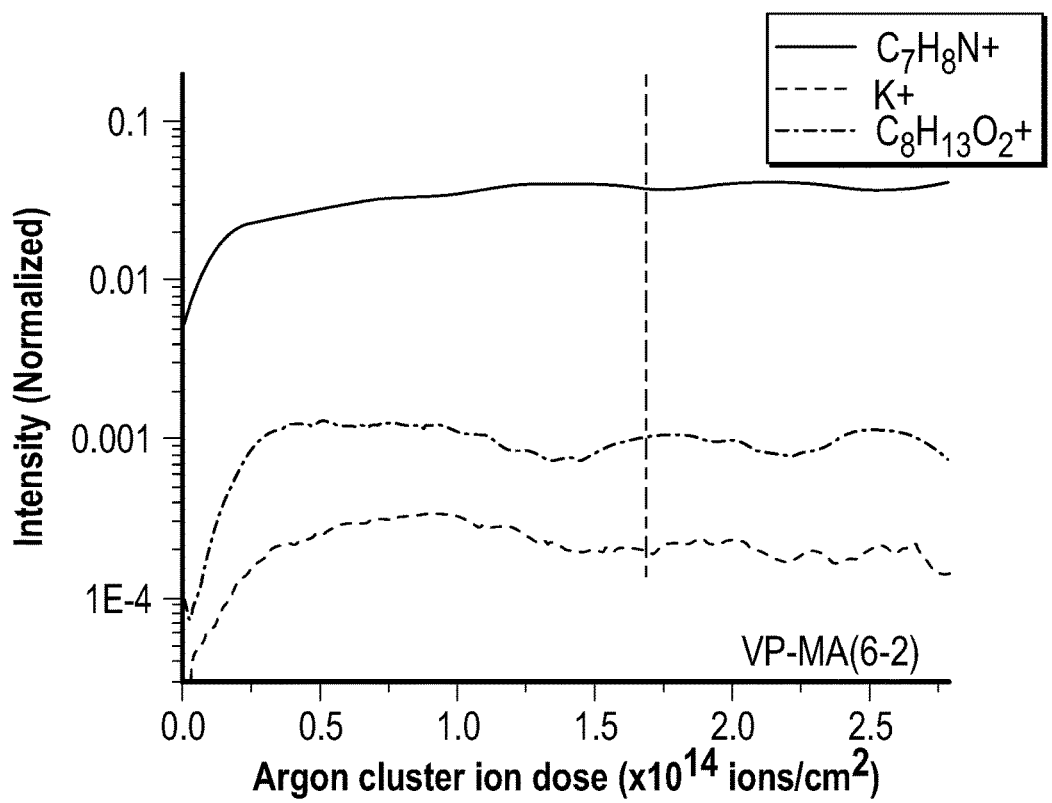
FIG. 4C depicts the normalized intensity of positive ion detection as a function of ion dose determined for an embodiment of a copolymer subjected to a 6 hour quaternization followed by 2 hour hydrolysis and KOH treatment.
Figure 4D:
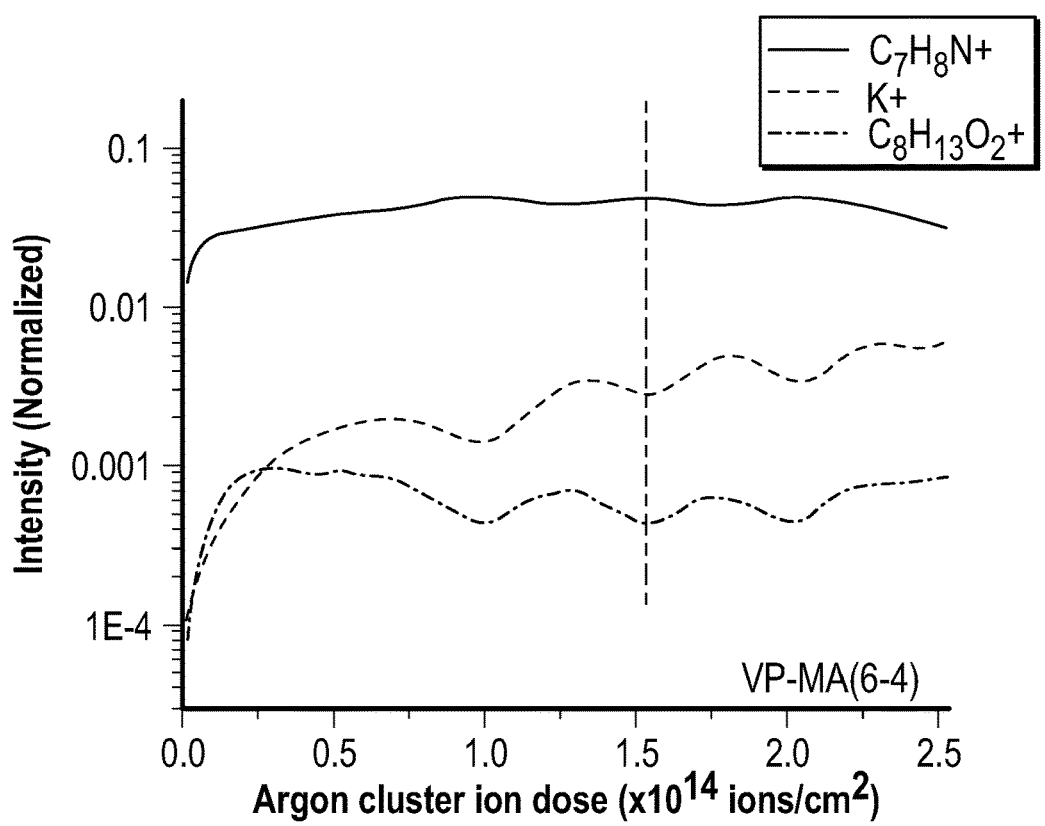
FIG. 4D depicts the normalized intensity of positive ion detection as a function of ion dose determined for an embodiment of a copolymer subjected to a 6 hour quaternization followed by 4 hour hydrolysis and KOH treatment.

FIG. 4A, FIG. 4B, FIG. 4C, and FIG. 4D depict the normalized intensities of positive ion detection as a function of ion dose determined by ToF-SIMS in positive ion mode for an untreated (neutral) copolymer (VP-MA(0-0)) (FIG. 4A), a copolymer subjected to a 6 hour quaternization (VP-MA(6-0)) (FIG. 4B), a copolymer subjected to a 6 hour quaternization followed by 2 hour hydrolysis and KOH treatment (VP-MA(6-2)) (FIG. 4C), and a copolymer subjected to a 6 h quaternization followed by 4 h hydrolysis and KOH treatment (VP-MA(6-4)) (FIG. 4C). Intensities were normalized with point to point method using 10 neighboring points. The vertical dashed line is a guide to the eye to show the in-phase and out-of-phase composition fluctuations Analysis of VP-MA(0-0) in FIG. 4A revealed the ion signatures of both segments and provided a baseline for naturally existing $K^+$ ions within the untreated films. The normalized intensities of these signals remained relatively constant when analyzing VP-MA(6-0), as expected (FIG. 4B). Analysis of the films after hydrolysis, VP-MA(6-2) and VP-MA(6-4) (FIG. 4C and FIG. 4D, respectively) revealed an increase in overall $K^+$ content and a higher intensity with increased hydrolysis treatment. Additionally, in-phase composition oscillations of $K^+$ and the $C_8H_{13}O_2^+$ fragment of PtBMA were also observed and further corroborated the successful creation of charge mosaics with $K^+$ ions segregated within the PtBMA domains (FIG. 4D) and $Br^-$ ions within the P4VP domains (FIG. 3B).

Although the creation of nanostructured charge mosaics was shown to be successful on films with 6 hours of bromoethane vapor treatment, longer quaternization times (12 and 24 hours) revealed issues with film dewetting after hydrolysis treatment. The "over-ionization" of the P4VP domains may have created enhanced aqueous solubility and compromised film integrity when neutralized in KOH solution. After 12 hours of bromoethane and hydrolysis VP-MA (12-4), noticeable holes in the film were observed by AFM and confirmed by compositional ToF-SIMS analysis. The compositional analysis image exhibited the presence of holes through the film. Although dewetting of polymer film can be detrimental for the depth profiling of the BCP structures by ToF-SIMS, 3D reconstruction methods using AFM and ToF-SIMS was possible.

Nevertheless, a loss of film integrity could preclude their utility for membrane applications. As expected, film dewetting was also observed after 24 hours of bromoethane vapor treatment and varying hydrolysis treatments; VP-MA (24-1), VP-MA(24-2), and VP-MA(24-4). AFM images of dewet film islands on the Si wafer surface were collected. Specifically, AFM height images of PtBMA-b-P4VP films with static bromoethane vapor treatment (24 hours) and varying HCl vapor treatment durations were collected for VP-MA(24-1) after 1 hour of treatment with HCl vapor and 0.01 M KOH, VP-MA(24-2) after 2 hours of treatment with HCl vapor and 0.01 M KOH, and VP-MA(24-4) after 4 hours of treatment with HCl vapor and 0.01 M KOH.

While the integrity of the overall film may have been compromised, the morphology of the BCP was still visible even after these more aggressive conditions.

The following materials and procedures were used in the foregoing examples.

Materials: All chemicals were used as received unless otherwise noted. n-dodecanethiol (≥98%), azobisisobutyronitrile (AIBN) recrystallized from methanol, carbon disulfide (99.9%), iodine chips (≥99%), magnesium sulfate (99.8%), 4,4'-azobis(4-cyanovaleric acid) (≥98.0%), 1,4-dioxane, N,N-dimethylacetamide (DMAC) (>99.8%), and potassium hydroxide pellets (≥85%) were purchased from Sigma-Aldrich. Ethyl acetate, sodium thiosulfate solution (0.10 N aqueous), hexanes, toluene, chloroform, methanol, and HCl (36-38% ACS) were purchased from VWR. tert-Butyl methacrylate (tBMA) (>98%) (inhibitor removed via passage through basic alumina prior to use) and bromoethane (99%) were purchased from TCI chemicals. Sodium hydride (NaH, 60% in mineral oil), 4-vinyl pyridine (4VP, 95%, distilled under reduced pressure before use) was purchased from Alfa-Aesar. Aluminum oxide (basic Brockman grade I) was purchased from Beantown chemical. Diethyl ether (DEE) (anhydrous stabilized with BHT) and tetrahydrofuran (THF) (unstabilized) were obtained from an SG Waters glass contour solvent purification system that was packed with neutral alumina and the solvents were passed through a 2 μm filter prior to being dispensed.

Characterization: $^1H$ NMR experiments were conducted on a Bruker Advance III 400 or 600 MHz spectrometer.

Number average molar mass ($M_n$) and dispersity (Đ) of polymer samples were determined by size exclusion chromatography (SEC) on an Agilent-Wyatt combination triple detection system (THF mobile phase) containing 3 successive Agilent PLgel Mixed-C columns, an Agilent 1260 infinity series pump, degasser, autosampler, and thermostatted column chamber. The Wyatt triple detection unit hosts a mini-Dawn TREOS 3-angle light scattering detector, Optilab TrEX refractive index detector, and a Viscostar II differential viscometer.

Molar mass and dispersities were determined by light scattering using literature dn/dc values. Atomic Force Microscopy (AFM) images were obtained using an MFP-3D AFM equipped with an ARC2 controller (Asylum Research) using Nanoworld ARROW-NCR Al-coated silicon tips, 10 nm nominal radius, and force constant between 27 and 80 N $m^{-1}$.

AFM tips were calibrated under air and cantilever was tuned to 10% below the resonance frequency using the thermal fluctuation technique. Images were collected using a 1.0 Hz scan rate with 256 points and lines in tapping mode.

Water contact angles were measured using a dynamic contact angle instrument (Cahn instruments). Thermogravimetric analysis (TGA) was performed on a TA instruments TGA 550 by heating samples at a rate of 10° C. $min^{-1}$ under Ar (40 mL $min^{-1}$ flow rate) using an HT platinum pan.

Differential scanning calorimetry (DSC) was performed on a TA Instruments Model Q2000 with a model RCS90 refrigerated cooling system. Samples were cycled from 40° C. to 165° C. under $N_2$ (40 mL $min^{-1}$ flow rate) at a ramp rate of 10° C. $min^{-1}$.

Time-of-flight secondary ion mass spectrometry (ToF-SIMS): Negative and positive high mass resolution depth profiles were performed using a ToF-SIMS NCS instrument, which combined a TOF.SIMS[5] instrument (ION-TOF GmbH, Munster, Germany) and an in-situ scanning probe microscope (NanoScan, Switzerland).

30 keV $Bi_3^+$ ions (with a measured current of 0.2 pA) were used as a primary probe for analysis (scanned area 90×90 μm²), and sputtering was performed using $Ar_{1500}^+$ ions at 10 keV with a typical current around 0.1 nA (area 500×500 μm²). The beams were operated in non-interlaced mode, alternating 1 analysis cycle and 1 sputtering cycle (corresponding to 1.63 s) followed by a pause of 5 seconds for the charge compensation with an electron flood gun.

An adjustment of the charge effects was achieved using a surface potential. During the depth profiling, the cycle time was fixed to 200 μs (corresponding to m/z=0-3649 a.m.u. range). Each signal was normalized by the total ion intensity for each data point along the depth profiles. This standardization permitted a comparison of the normalized intensity through the film, and a display of different depth profiles on the same scale.

We claim:

1. A method for preparing a block copolymer (BCP), the method comprising:
   (i) providing a compound of formula (I)—

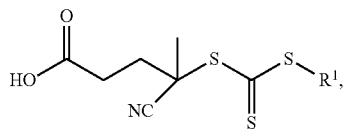

wherein $R^1$ is selected independently from a $C_1$-$C_{20}$ hydrocarbyl;
   (ii) providing a compound of formula (II)—

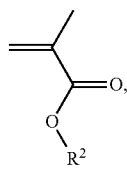

wherein $R^2$ is selected independently from a $C_1$-$C_{20}$ hydrocarbyl;
   (iii) contacting the compound of formula (I) and the compound of formula (II) to form an intermediate polymer; and
   (iv) contacting the intermediate polymer and vinylpyridine to form the block copolymer.

2. The method of claim 1, wherein the compound of formula (I) is 4-cyano-4-[(dodecylsulfanylthiocarbonyl)sulfanyl]pentanoic acid (CDPA):

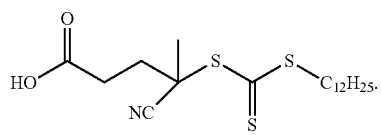

3. The method of claim 1, wherein the compound of formula (II) is t-butylmethacrylic acid (tBMA):

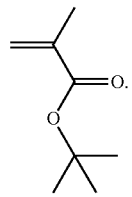

4. The method of claim 1, wherein—
   (i) the compound of formula (I) is contacted with a mol ratio of the compound of formula (II), wherein the mol ratio is about 1:200 to about 1:400 (formula (I):formula (II)),
   (ii) the intermediate polymer is contacted with a mol ratio of the vinylpyridine, wherein the mol ratio is about 1:400 to about 1:600 (intermediate polymer: vinylpyridine), or
   (iii) a combination thereof.

5. The method of claim 1, wherein the compound of formula (I) is contacted with a mol ratio of the compound of formula (II), wherein the mol ratio is about 1:250 to about 1:300 (formula (I):formula (II)).

6. The method of claim 1, wherein the intermediate polymer is contacted with a mol ratio of the vinylpyridine, wherein the mol ratio is about 1:480 to about 1:520 (intermediate polymer:vinylpyridine).

7. The method of claim 1, wherein the contacting of the intermediate polymer and the vinylpyridine occurs in the presence of a radical initiator.

8. A block copolymer (BCP) having the following structure:

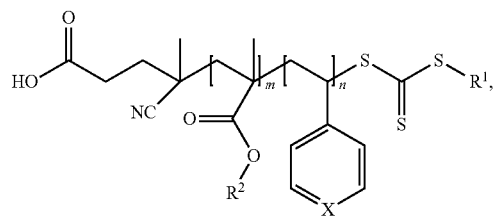

wherein—
$R^1$ is selected independently from a $C_1$-$C_{20}$ hydrocarbyl,
each $R^2$ is selected independently from the group consisting of hydrogen and a $C_1$-$C_{20}$ hydrocarbyl,
each X is selected independently from N or $N^+R^3$, wherein each $R^3$ is selected independently from a $C_1$-$C_{20}$ hydrocarbyl, and
m and n are selected independently from an integer from 1 to 10,000.

9. The block copolymer of claim 8, wherein $R^1$ is an unsubstituted linear $C_{12}$ hydrocarbyl, $R_2$ is t-butyl, X is N, and the block copolymer has the following structure:

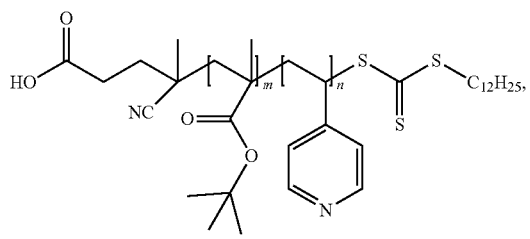

wherein m and n are selected independently from an integer from 1 to 10,000.

10. The block copolymer of claim 8, wherein m is an integer from 200 to 400, and n is an integer from 400 to 600.

11. The block copolymer of claim 8, wherein a ratio of m to n is about 1:1 to about 1.5:1.

12. The block copolymer of claim 8, wherein a ratio of m to n is about 1.25:1.

13. A thin film comprising the block copolymer of claim 8.

14. The thin film of claim 13, wherein the thin film comprises at least one first region consisting of a poly-4-vinylpyridine portion of the block copolymer.

15. The thin film of claim 14, wherein the poly-4-vinylpyridine portion comprises at least one monomer wherein X is $N^+R^3$.

16. The thin film of claim 14, wherein the thin film comprises a plurality of the first regions, and each first region is in the form of a hexagonally-packed cylinder.

17. The thin film of claim 16, wherein the plurality of first regions is dispersed in a matrix comprising a poly-t-butyl-methacrylate portion of the block copolymer.

18. The thin film of claim 17, wherein the poly-t-butyl-methacrylate portion comprises at least one monomer wherein $R^2$ is hydrogen.

19. A method of forming a thin film of a self-assembled block copolymer, the method comprising:

(i) providing a block copolymer (BCP) having the following structure—

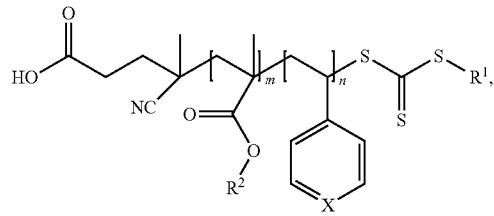

wherein—
$R^1$ is selected independently from a $C_1$-$C_{20}$ hydrocarbyl,
$R^2$ is selected independently from a $C_1$-$C_{20}$ hydrocarbyl,
X is N, and
m and n are selected independently from an integer from 1 to 10,000; and (ii) disposing the block copolymer on a substrate to form the thin film.

20. The method of claim 19, further comprising:
(i) contacting the thin film with an amount of a quaternizing agent effective to quaternize at least one X to $N^+R^3$, wherein $R^3$ is selected independently from a $C_1$-$C_{20}$ hydrocarbyl,
(ii) contacting the thin film with an amount of a hydrolyzing agent effective to hydrolyze at least one $R^2$ to hydrogen, or
(iii) a combination thereof.

* * * * *